(12) United States Patent
Clavaud et al.

(10) Patent No.: US 8,902,711 B2
(45) Date of Patent: Dec. 2, 2014

(54) SYSTEM AND METHOD FOR ANALYZING AND TRANSFORMING GEOPHYSICAL AND PETROPHYSICAL DATA

(75) Inventors: Jean-Baptiste Clavaud, Houston, TX (US); Paul Theologou, Houston, TX (US); Donna Venable, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 501 days.

(21) Appl. No.: 12/616,714

(22) Filed: Nov. 11, 2009

(65) Prior Publication Data

US 2011/0110192 A1 May 12, 2011

(51) Int. Cl.
*G01V 1/28* (2006.01)
*G01V 11/00* (2006.01)

(52) U.S. Cl.
CPC .................................... *G01V 11/00* (2013.01)
USPC ........................................................... 367/73

(58) Field of Classification Search
CPC ...................................................... G01V 11/00
USPC .............. 73/152.01, 152.02, 152.05, 152.14; 166/250.01; 367/33, 37, 38, 73; 709/9; 702/18, 14
See application file for complete search history.

(56) References Cited

U.S. PATENT DOCUMENTS

| | | | |
|---|---|---|---|
| 4,346,592 A * | 8/1982 | Fertl et al. .................. | 73/152.05 |
| 5,226,019 A | 7/1993 | Bahorich | |
| 6,091,669 A * | 7/2000 | Chen .............................. | 367/37 |
| 6,128,577 A | 10/2000 | Assa et al. | |
| 6,686,736 B2 * | 2/2004 | Schoen et al. ................ | 324/303 |
| 6,820,010 B1 * | 11/2004 | Sahai et al. .................... | 702/18 |
| 6,826,483 B1 * | 11/2004 | Anderson et al. .............. | 702/13 |
| 7,168,310 B2 * | 1/2007 | Al-Ruwaili ................ | 73/152.18 |
| 8,101,907 B2 * | 1/2012 | Jacobi et al. ................. | 250/256 |
| 2004/0093161 A1 | 5/2004 | Inubushi | |
| 2005/0086006 A1 | 4/2005 | Favret et al. | |
| 2006/0136162 A1 | 6/2006 | Hamman et al. | |
| 2011/0067857 A1 * | 3/2011 | Underhill et al. ........ | 166/250.01 |

OTHER PUBLICATIONS

Ezekwe, "Petroleum Reservoir Engineering Practice," Prentice-Hall, 2010, as excerpted by Informit and downloaded May 17, 2012, 3 pages.*
Quirein et al. "A Coherent Framework for Developing and Applying Multiple Formation Evaluation Models," SPWLA Twenty-Seventh Annual Logging Symposium, Jun. 9-13, 1986, pp. 1-17.*
Robert E. Sheriff, "Encyclopedic Dictionary of Exploration Geophysics" Second Edition (1984) by the Society of Exploration Geophysicists.
Quirein, S., et al.; "A Coherent Framework for Developing and Applying Multiple Formation Evaluation Models"; SPWLA Twenty-Seventh Annual Logging Symposium, Jun. 9-13, 1986, pp. 1-17.
Patent Examination Report No. 1, issued on Jun. 2, 2014, during the prosecution of Australian Patent Application No. 2010319705.

* cited by examiner

*Primary Examiner* — Daniel L Murphy
(74) *Attorney, Agent, or Firm* — Albert K. Shung

(57) ABSTRACT

A computer system and a computer-implemented method for analyzing input data from a geological volume of interest in a subterranean formation. The method includes processing the input data using a first subterranean interpretation model, the first subterranean interpretation model being configured to provide first output data that are representative of characteristics of the geological volume of interest. The method further includes processing the input data using a second subterranean interpretation model, the second subterranean interpretation model being configured to provide second output data that are representative of the characteristics of the geological volume of interest. The method further includes determining a relationship between the first output data and the second output data, and transforming the second output data into the first output data using the relationship to obtain a transformed second output data.

13 Claims, 3 Drawing Sheets

SYSTEM AND METHOD FOR ANALYZING AND TRANSFORMING GEOPHYSICAL AND PETROPHYSICAL DATA

FIELD OF THE INVENTION

The present invention pertains in general to computation methods and more particularly to a computer system and computer-implemented method for analyzing and converting geophysical and petrophysical data.

BACKGROUND OF THE INVENTION

There are a number of models and methodologies that are used to compute or evaluate geophysical or petrophysical properties. For example, there is the conventional deterministic model method for evaluating or computing geophysical and petrophysical properties. There is also a Chevron deterministic model implemented by Chevron U.S.A. Inc. This method enhances the conventional deterministic method. There are also the multi-mineral methods (e.g., MULTIMIN deterministic model from Paradigm Ltd or ELAN from Schlumberger Ltd or QUANTIMIN from Techsia SA or MINSOLVE from Senergy Ltd).

The most fundamental differences between the above-mentioned methods are how these methods treat the "volumetrics." In other words, the main differences between the above three methods lie in the way the various properties relating to rocks or formations in the underground are presented or treated. In general, in all of the above-mentioned methods, a set of volumes describes the underground or subsurface geology (i.e., the formations underground). In that particular set of volumes, all the volumes must sum to 100%, in accordance with the mass conservation principle.

The above three methods describe sand and shale in the rock. However, these three methods differ about what the "elemental" brick constituting the rock is. For example, in the deterministic model "shale" is a rock with substantial amounts of clay and some quartz (which both are minerals forming rocks in the multi-mineral model). In addition, calcite and dolomite (which is a carbonate rock forming mineral) are also handled explicitly. Each method uses a different set of output properties to describe a rock formation. Hence, users of these methods must be able to interpret the output properties according to the method used to obtain the properties.

In some instances, users of different methods will have difficulties relaying to each other the results as each user uses a different set of output properties. This can pose some challenges in communication, as the two users "speak a different language". Furthermore, a user may also seek to obtain information on the rock formation using two or more different methods, for example to check accuracy of the output properties or results or for quality control purposes. Because, each of the method outputs a different set of output properties, the user must convert a value of one output parameter from one to another manually. This can be tedious and subject to human errors.

SUMMARY

An aspect of the present invention is to provide a computer-implemented method for analyzing input data from a geological volume of interest in a subterranean formation. The method includes processing the input data using a first subterranean interpretation model, the first subterranean interpretation model being configured to provide first output data that are representative of characteristics of the geological volume of interest, and processing the input data using a second subterranean interpretation model, the second subterranean interpretation model being configured to provide second output data that are representative of the characteristics of the geological volume of interest. The method further includes determining a relationship between the first output data and the second output data, and transforming the second output data into the first output data using the relationship to obtain a transformed second output data. The method further includes determining the characteristics of the geological volume of interest using the first output data provided by the first subterranean model and the transformed second output data. In an embodiment, the second output data itself is also used to determine the characteristics of the geological volume of interest.

In one aspect of the invention, there is provided a computer product having machine executable instructions, the instructions being executable by a machine to perform a method for analyzing input data from a geological volume of interest in a subterranean formation, the method including: processing the input data using a first subterranean interpretation model, the first subterranean interpretation model being configured to provide first output data that are representative of characteristics of the geological volume of interest; processing the input data using a second subterranean interpretation model, the second subterranean interpretation model being configured to provide second output data that are representative of said characteristics of the geological volume of interest; determining a relationship between said first output data and said second output data; transforming said second output data into said first output data using said relationship; and determining the characteristics of the geological volume of interest using the first output data provided by the first subterranean model and the transformed second output data. In an embodiment, the second output data itself is also used to determine the characteristics of the geological volume of interest.

In another aspect of the invention, there is provided a computer product having machine executable instructions, the instructions being executable by a machine to perform a method for analyzing input data from a geological volume of interest in a subterranean formation, the method including: processing the input data using a first subterranean interpretation model, the first subterranean interpretation model being configured to provide first output data that are representative of characteristics of the geological volume of interest; processing the input data using a second subterranean interpretation model, the second subterranean interpretation model being configured to provide second output data that are representative of said characteristics of the geological volume of interest; processing the input data using a third subterranean interpretation model, the third subterranean interpretation model being configured to provide third output data that are representative of said characteristics of the geological volume of interest; determining a first relationship between said first output data and said second output data; transforming said second output data into said first output data using said first relationship; determining a second relationship between said first output data and said third output data; transforming said third output data into said first output data using said second relationship; and determining the characteristics of the geological volume of interest using the first output data provided by the first subterranean model, the second output data, the third output data, and the transformed second and third output data.

In an aspect of the invention, there is provided a computer product having machine executable instructions, the instructions being executable by a machine to perform a method for analyzing input data from a geological volume of interest in a subterranean formation, the method including: processing the input data using a first subterranean interpretation model, the first subterranean interpretation model being configured to provide first output data that are representative of characteristics of the geological volume of interest; processing the input data using a second subterranean interpretation model, the second subterranean interpretation model being configured to provide second output data that are representative of said characteristics of the geological volume of interest; processing the input data using a third subterranean interpretation model, the third subterranean interpretation model being configured to provide third output data that are representative of said characteristics of the geological volume of interest; determining a first relationship between said first output data and said second output data; transforming said second output data into said first output data using said first relationship; determining a second relationship between said first output data and said third output data; transforming said third output data into said first output data using said second relationship; determining a third relationship between said second output data and said third output data; transforming said third output data into said second output data using said third relationship; and determining the characteristics of the geological volume of interest using the first output data provided by the first subterranean model, the second output data, the third output data, and the transformed second and third output data.

Another aspect of the present invention is to provide a system for evaluating a geophysical and petrophysical model for analyzing input data from a geological volume of interest in a subterranean formation. The system includes a computer readable memory configured to store the input data from the geological volume of interest in the subterranean formation, and a computer processor in communication with the computer readable memory. The computer processor is configured to (i) process the input data using a first subterranean interpretation model, the first subterranean interpretation model being configured to provide first output data that are representative of characteristics of the geological volume of interest; (ii) process the input data using a second subterranean interpretation model, the second subterranean interpretation model being configured to provide second output data that are representative of the characteristics of the geological volume of interest; (iii) determine a relationship between the first output data and the second output data; (iv) transform the second output data into the first output data using the relationship to obtain a transformed second output data; and (v) determine the characteristics of the geological volume of interest using the first output data provided by the first subterranean model and the transformed second output data. In an embodiment, the second output data itself is also used to determine the characteristics of the geological volume of interest.

In an aspect of the invention, there is provided a system for evaluating a geophysical and petrophysical model for analyzing input data from a geological volume of interest in a subterranean formation, including a computer readable memory configured to store the input data from the geological volume of interest in the subterranean formation; and a computer processor in communication with the computer readable memory, the computer processor being configured to: process the input data using a first subterranean interpretation model, the first subterranean interpretation model being configured to provide first output data that are representative of characteristics of the geological volume of interest; process the input data using a second subterranean interpretation model, the second subterranean interpretation model being configured to provide second output data that are representative of the characteristics of the geological volume of interest; process the input data using a third subterranean interpretation model, the third subterranean interpretation model being configured to provide third output data that are representative of the characteristics of the geological volume of interest; determine a first relationship between the first output data and the second output data; determine a second relationship between the third output data and the first output data; determine a third relationship between the third output data and the second output data; transform the second output data into the first output data using the first relationship to obtain a transformed second output data; transform the third output data into the first output data using the second relationship to obtain transformed third output data; transform the third output data into the second output data using the third relationship to obtain transformed third output data; and determine the characteristics of the geological volume of interest using the first output data provided by the first subterranean model, the second output data, the third output data, and the transformed second and third output data.

Although the various steps of the method according to one embodiment of the invention are described in the above paragraphs as occurring in a certain order, the present application is not bound by the order in which the various steps occur. In fact, in alternative embodiments, the various steps can be executed in an order different from the order described above or otherwise herein. For example, it is contemplated to transform from, the first model to the second model, or vice versa; or to transform from the third model to the second model, or vice versa; or yet to transform from the third model to the first model, or vice versa.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
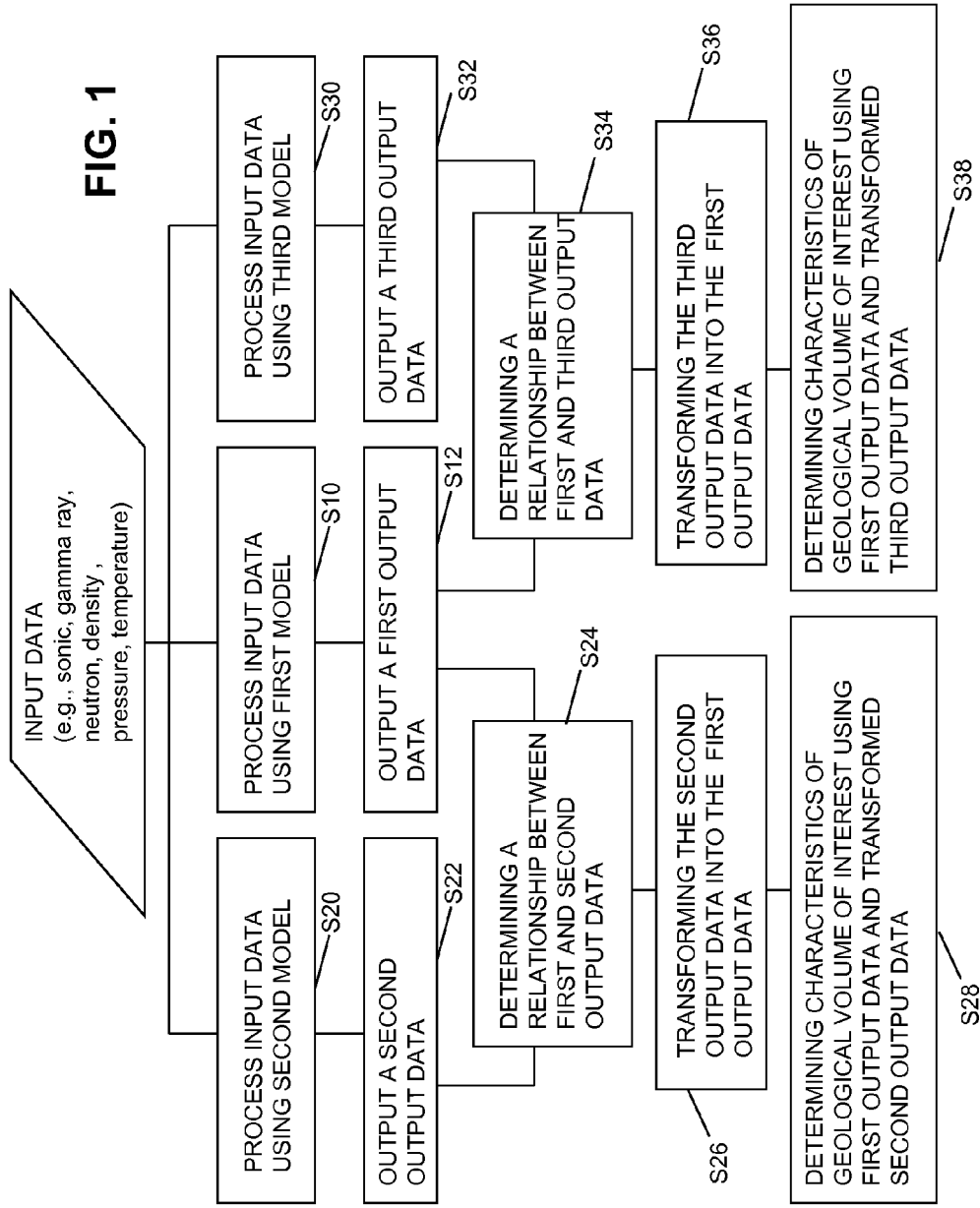
FIG. 1 is a flow chart of a method for evaluating a geophysical and petrophysical model, according to an embodiment of the present invention.

FIG. 1 depicts a flow chart of a method of analyzing input data from a geological volume of interest in a subterranean formation, according to an embodiment of the invention. The method includes processing input data using a first subterranean interpretation model, at S10. The input data can be for example log data and borehole information from a single well or multiple wells, from wireline logs or logging-while-drilling (LWD) logs, including but not limited to sonic log, a gamma ray log, a density log, a neutron log, a resistivity log, a pressure log and a temperature log.

The first subterranean interpretation model is configured to provide first output data that are representative of characteristics of the geological volume of interest, at S12. In one embodiment, the first subterranean interpretation model is the deterministic model.

In the deterministic model, one equation and a set of six representative properties are used to describe a formation or geological volume of interest. The equation states that a sum of a shale volume (VSH) and a sand volume (VSD) is equal to one for a volume or formation of interest. This expressed by the following equation (1).

$$VSH+VSD=1 \quad (1)$$

The six properties are the total porosity in the volume or formation (PHIT), the effective porosity in the volume or formation (PHIE), the total water saturation in the volume or formation (SWT), the total water saturation in the invaded zone near the well bore (SXO) within the volume or formation of interest, the effective water saturation (SWE) within the volume or formation of interest, and the effective water saturation in the invaded zone near the well bore (SXOE) within the volume or formation of interest.

In one embodiment, the first output data include at least one of a shale volume (VSH) and a sand volume (VSD) in the volume of interest. The VSH and VSD data satisfy equation (1) above. The first output data may further include total porosity in the volume or formation (PHIT), the effective porosity in the volume or formation (PHIE), the total water saturation in the volume or formation (SWT), the total water saturation in the invaded zone near the well bore (SXO) within the volume or formation of interest, the effective water saturation (SWE) within the volume or formation of interest, and the effective water saturation in the invaded zone near the well bore (SXOE) within the volume or formation of interest.

The method further includes processing the same input data processed by the first subterranean interpretation model (e.g., the deterministic model) using a second subterranean interpretation model, at S20. The second subterranean interpretation model can be any other model that is different from the first subterranean interpretation model. In one embodiment, the second subterranean interpretation model is the Chevron deterministic model.

The second subterranean interpretation model (e.g., the Chevron deterministic model) is configured to provide second output data that are representative of the characteristics of the geological volume of interest, at S22.

In the Chevron deterministic method, four equations and a set of 4 output properties representative of the output data are used to describe a formation of interest. The first equation states that a sum of the volume of the sand matrix (VOL_SD) and the volume of the wet shale (VOL_SH) and the effective porosity (PHIE) in the volume or formation of interest is equal to 1. This is expressed in the following equation (2).

$$VOL\_SD+VOL\_SH+PHIE=1 \quad (2)$$

The second equation states that the sum of volume of sand matrix (VOL_SD) in the volume of interest and the volume of dry shale matrix (VOL_DSH) in the volume of interest and the total porosity (PHIT) in the volume of interest is equal to 1. This can be expressed by the following equation (3).

$$VOL\_SD+VOL\_DSH+PHIT=1 \quad (3)$$

The third equation states that the effective porosity (PHIE) in the volume of interest is equal to the total porosity (PHIT) in the volume of interest minus the volume of clay bound water in the volume of interest. This can be expressed by the following equation (4).

$$PHIE=PHIT-\text{Volume of Clay Bound water} \quad (4)$$

The fourth equation states that the volume of dry shale matrix (VOL_DSH) in the volume of interest is equal to the volume of wet shale matrix (VOL_SH) in the volume of interest minus the volume of clay bound water in the volume of interest. This can be expressed by the following equation (5).

$$VOL\_DSH=VOL\_SH-\text{Volume of Clay Bound Water} \quad (5)$$

The four properties are the total water saturation in the volume or formation (SWT), the total water saturation in the invaded zone near the well bore (SXO) within the volume or formation of interest, the effective water saturation (SWE) within the volume or formation of interest, and the effective water saturation in the invaded zone near the well bore (SXOE) within the volume or formation of interest.

The second output data include a wet shale volume (VOL_SH), a dry shale volume (VOL_DSH), a sand matrix volume (VOL_SD), a volume of clay bound water (VOL_CLAY BOUND_WATER), a total porosity (PHIT) and an effective porosity (PHIE). This output data obtained in the Chevron deterministic model satisfy the above 4 equations (2), (3), (4) and (5) in the geological volume of interest. The second output data may further include the total water saturation in the volume or formation (SWT), the total water saturation in the invaded zone near the well bore (SXO) within the volume or formation of interest, the effective water saturation (SWE) within the volume or formation of interest, and the effective water saturation in the invaded zone near the well bore (SXOE) within the volume or formation of interest.

In order to evaluate the first and second output data to determine the relationship between these two data, for example to assess accuracy of the first and/or second models or for quality assurance purposes, the second output data is converted to the first output data. It is contemplated that the data can include one or more data, e.g. a set of data. However, before converting the second output data into the first output data a relationship between the first output data and the second output data must be determined.

Therefore, the method further includes determining a relationship between the first output data and the second output data, at S24, and transforming the second output data into the first output data using the relationship to obtain a set of transformed second output data, at S26.

For example to transform the second output data (e.g., VOL_SH) obtained using the Chevron deterministic model into the first output data (e.g., VSH) obtained using the deterministic model, the following equation (6) is used.

$$VSH=VOL\_SH/(1-PHIE\_\text{shale}) \quad (6)$$

where PHIE_shale is the effective porosity of the shale within the volume of interest.

For example, by using the relationship (6) the second output data VOL_SH obtained by using the second model (in this example, the Chevron deterministic model) can be transformed into the first output data VSH' of the first model (in this example, the deterministic model), as follows $$VSH'=VOL\_SH/(1-PHIE\_\text{shale}) \quad (7)$$

The transformed second output data VSH' data can then be compared with the VSH data obtained by using the first model (e.g., the deterministic model) to determine if the VSH' data is compatible with the VSH data.

In one embodiment, the transformed VSH' data is deemed compatible with the VSH data if, for example, a difference between the VSH' data and the VSH data is less than a desired set threshold or when a ratio of the VSH' data and VSH data, or vice versa, is approximately equal to one.

In one embodiment, if the transformed second output data (in this example VSH' data) is deemed compatible with the first output data (e.g., VSH), then the first output data (e.g., VSH), the second output data (VOL_SH), and the transformed second output data (VSH') are used to determine the characteristics of the geological volume of interest, at S28. In an embodiment, the second output data itself is also used to determine the characteristics of the geological volume of interest.

If the transformed second output data (in this example VSH' data) is deemed not compatible with the first output data (e.g., VSH), for example when the difference between VSH' and VSH is greater than the desired set threshold, then the first model and/or second model are further evaluated.

In another embodiment, an average value between the VSH data and the VSH' data, i.e., (VSH+VSH')/2, can be used to determine the characteristics of the geological volume of interest.

Although, an example of transformation is given above with respect to VSH, it will be appreciated that any one or more of first output data or second output data can be transformed. Hence, in one embodiment, the method further includes determining a plurality of relationships between the first output data and the second output data, transforming said second output data into the first output data using the plurality of relationships, and determining the characteristics of the geological volume of interest based on the first output data provided by the first subterranean model and the transformed second output data by the plurality of relationships.

In yet another embodiment, the method further includes processing the input data using a third subterranean interpretation model, the third subterranean interpretation model being configured to provide third output data that are representative of said characteristics of the geological volume of interest, at S30.

In one embodiment the third subterranean model can be different from the first and the second subterranean models. In one embodiment, the third subterranean model is the multi-mineral deterministic model (e.g. MULTIMIN deterministic model from Paradigm Ltd or ELAN from Schlumberger Ltd or QUANTIMIN from Techsia SA or MINSOLVE from Senergy Ltd).

In the multi-mineral modeling method (used in mineralogy world), four equations and a set of 3 properties are used to describe a formation of interest. The first equation states that the sum of the volume of quartz matrix (VOL_QTZ) in the volume of interest and the volume of wet clay mineral (VOL_CLAY) in the volume of interest and the effective porosity (PHIE) in the volume of interest is equal to 1. This can be expressed by the following equation (8).

$$VOL\_QTZ + VOL\_CLAY + PHIE = 1 \quad (8)$$

The second equation states that the sum of volume of sand matrix (VOL_SD) in the volume of interest and the volume of dry clay mineral (VOL_DCL) in the volume of interest and the total porosity (PHIT) in the volume of interest is equal to 1. This can be expressed by the following equation (9).

$$VOL\_QTZ + VOL\_DCL + PHIT = 1 \quad (9)$$

The third equation states that the effective porosity (PHIE) in the volume of interest is equal to the total porosity (PHIT) in the volume of interest minus the volume of clay bound water (VOL_CLAY_BOUND_WATER) in the volume of interest. This can be expressed by the following equation (10).

$$PHIE = PHIT - VOL\_CLAY\_BOUND\_WATER \quad (10)$$

The fourth equation states that the volume of dry clay mineral (VOL_DCL) in the volume of interest is equal to the volume of wet clay mineral (VOL_CLAY) in the volume of interest minus the volume of clay bound water (VOL_CLAY_BOUND_WATER) in the volume of interest. This can be expressed by the following equation (11).

$$VOL\_DCL = VOL\_CLAY - VOL\_CLAY\_BOUND\_WATER \quad (11)$$

The four properties in the multi-mineral modeling method are the total water saturation in the volume of interest (SWT), the total water saturation in the invaded zone near the well bore (SXO) within the volume of interest, the volume of clay bound water in the volume of interest (VOL_CLAY_BOUND_WATER) and the volume of hydrocarbon in the volume of interest (VOL_HC).

In one embodiment, the third output data includes at least one of a volume of wet clay mineral (VOL_CLAY), a volume of Dry Clay Mineral (VOL_DCL), a volume of Quartz (VOL_QTZ), a volume of clay bound water, a total porosity, and an effective porosity. In another embodiment, the third output data further includes the total water saturation in the volume of interest (SWT), the total water saturation in the invaded zone near the well bore (SXO) within the volume of interest, the volume of clay bound water in the volume of interest (VOL_CLAY_BOUND_WATER) and the volume of hydrocarbon in the volume of interest (VOL_HC).

In order to evaluate the first and third output data to determine the relationship between these two data, for example to assess accuracy of the third model or for quality assurance purposes, the third output data is converted into the first output data. However, before converting the third output data into the first output data a relationship between the first output data and the third output data must be determined.

Therefore, the method further includes determining a relationship between the first output data and the third output data, at S34, and transforming the third output data into the first output data using the relationship to obtain a transformed third output data, at S36.

For example, to transform the third output data (e.g., VOL_DCL) obtained using the multi-mineral modeling method into the first output data (e.g., VSH) obtained using the deterministic model the following equation (12) is used.

$$VSH = VOL\_DCL / VOL\_DCL\_shale \quad (12)$$

where VOL_DCL_shale is the maximum amount of dry clay in a shale.

Similarly to the relationship between VSH and VSH', by using the relationship (12), the third output data VOL_DCL obtained by using the third model (in this example, the multi-mineral modeling method) can be transformed into the first output data VSH" of the first model (in this example, the deterministic model), as follows in equation (13).

$$VSH'' = VOL\_DCL / VOL\_DCL\_shale \quad (13)$$

The transformed third output data VSH" data can then be compared with the VSH data obtained by using the first model (e.g., the deterministic model) and compared with the transformed second output data VSH' to determine if the VSH" data is compatible with the VSH data and the VSH' data.

In one embodiment, the transformed VSH" data is deemed compatible with the VSH data if, for example, a difference between the VSH" data and the VSH data is less than a desired set threshold or when a ratio of the VSH" data and VSH data, or vice versa, is approximately equal to one.

In one embodiment, if the transformed third output data (in this example VSH" data) is deemed compatible with the first output data (e.g., VSH), then the first output data (e.g., VSH), the third output data (VOL_DCL), and the transformed third output data (VSH") are used to determine the characteristics of the geological volume of interest, at S38. In an embodiment, the third output data itself is also used to determine the characteristics of the geological volume of interest.

If the transformed third output data (in this example VSH" data) is deemed not compatible with the first output data (e.g., VSH), for example when the difference between VSH" and VSH is greater than the desired set threshold, then the third model is further evaluated.

In another embodiment, an average value between the VSH data and the VSH" data, i.e., (VSH+VSH")/2, can be used to determine the characteristics of the geological volume of interest.

In yet another embodiment, an average value between the VSH data and the VSH' data of the transformed or converted second output data and VSH" data of the transformed or converted third output data can be computed, i.e., (VSH+VSH'+VSH")/3, to determine the characteristics of the geological volume of interest.

Although, an example of transformation is given above with respect to VSH, as it can be appreciated any one or more of first output data or second output data can be transformed. Hence in one embodiment, the method further includes determining a plurality of relationships between the first output data and the third output data, transforming the third output data into the first output data using the plurality of relationships, and determining the characteristics of the geological volume of interest based on the first output data provided by the first subterranean model and the transformed third output data by the plurality of relationships.

In a further embodiment of the invention, it is envisioned to convert the third output data into the second output date or vice versa. For example, in order to evaluate the second and third output data to determine the relationship between these two data, for example to assess accuracy of the third model or for quality assurance purposes, the third output data may be converted into the second output data. However, before converting the third output data into the second output data a relationship between the second output data and the third output data is determined.

Therefore, in one embodiment, the method further includes determining a relationship between the second output data and the third output data, and transforming the third output data into the second output data using the relationship to obtain a transformed third output data.

For example, in order to transform the third output data (e.g., VOL_CLAY) obtained using the multi-mineral optimizing method into the second output data (e.g., VOL_SH) obtained using the Chevron deterministic model the following equation (14) is used.

$$VOL\_SH = (1 - PHIE) * (VOL\_CLAY / VOL\_WET\_CLAY\_shale) \quad (14)$$

where VOL_WET_CLAY_shale is the amount of wet clay (from model 3) in shale.

In addition, it will be appreciated that once the relationships between the different models (e.g. between the first model and/or second model and/or third model) are established for one well, those relationships can be used for all other wells in the field.

Figure 2:
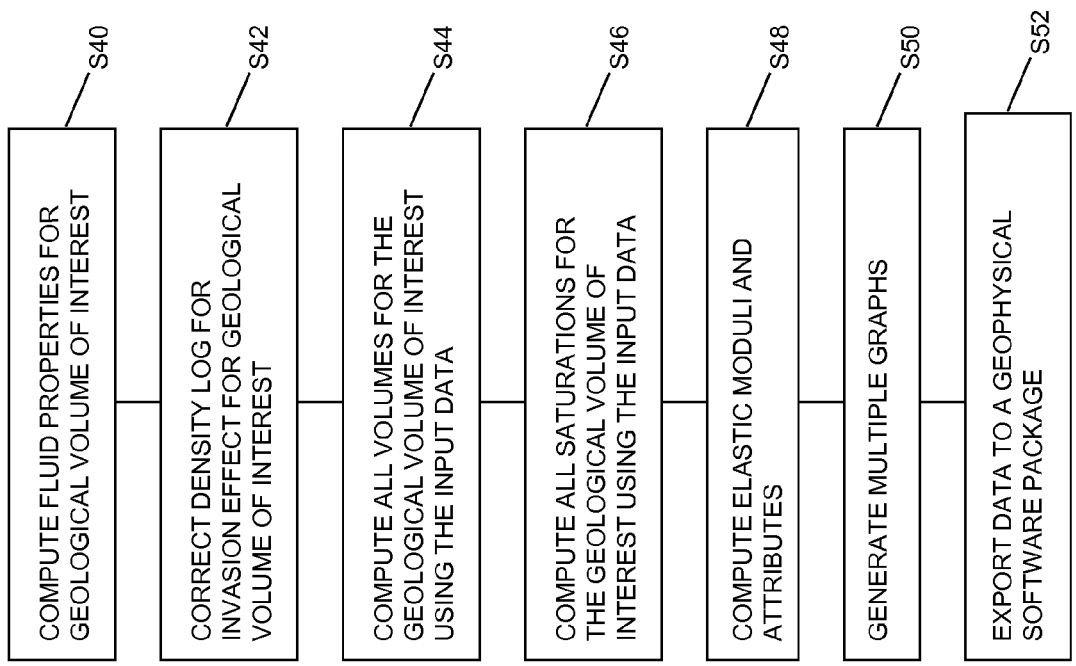
FIG. 2 is a flow chart of a method for evaluating a geophysical and petrophysical model, according to a further embodiment of the present invention.

FIG. 2 is a flow diagram of a method of analyzing geophysical and petrophysical data according to a further embodiment of the present invention. The method described above further includes (a) computing fluid properties for the geological volume of interest using the input data, at S40, and (b) correcting density log for invasion effect and tool reading effects for the geological volume of interest using the input data to obtain a corrected density $\rho_{bres}$, at S42. This corrected density represents the true density of the geological volume of interest beyond the invaded zone where no invasion of drilling fluid takes place (i.e. away from the borehole). The corrected density can be expressed by the following equation (15)

$$\rho_{bres} = \rho_b - \phi_t (\rho_{bfX} - \rho_{bfU}) \quad (15)$$

wherein $\phi_t$ a total porosity of the volume of interest, $\rho_{bfX}$ a measured density of a fluid mixture in an invaded zone (X) proximate a wellbore and $\rho_{bfU}$ a true density of the fluid mixture in the un-invaded zone (U) at a distance from the wellbore. The difference of the fluid density between the invaded zone (X) and the un-invaded zone (U) represent the invasion process where at any given point in time and at any given depth a drilling fluid that can be lighter or heavier than the original formation fluid, displace some or all of the original fluid in place. The difference of the "measured" and "true" density represents the characteristics of wireline/LWD tool responses that make the measured density reading different to the actual true density of the formation.

Similarly to comparing the shale volumes from the three models VSH, VSH', VSH", the saturations and fluid volumes from the three models can also be compared. In one embodiment, the method described above further includes (c) computing all liquid volumes for the geological volume of interest using the input data if the output of the second or third subterranean interpretation model is saturation, such that volume of phase "i" is equal to porosity multiplied by the saturation of the phase "i", at S44.

In one embodiment, the method further includes (d) computing all saturations for the geological volume of interest using the input data if the output of the second or third subterranean interpretation model is volume, such that the saturation of the phase is equal to the volume of the phase divided by the porosity, at S46, and (e) computing elastic moduli and attributes using the input data, at S48. In one embodiment, the elastic moduli includes, but is not limited to, bulk modulus, shear modulus, and Poisson's ratio.

In one embodiment, the density of the fluid mixture in the invaded zone (X) proximate the wellbore $\rho_{bfX}$ is an output of the second subterranean interpretation model. In one embodiment, the second model output provides the density of the fluid mixture in the invaded zone (X): $\rho_{bfX} = S_{hc} \rho_{bhc} + S_{xo} \rho_{bw}$, where hc is the hydrocarbon phase and w is the water phase that is the same for both oil base mud and water base mud, $S_{hc}$ and $\rho_{bhc}$ are respectively saturation and density of the hydrocarbon phase, $\rho_{bw}$ is density of the water phase, and $S_{xo}$ the water saturation in the invaded zone (X), such that $S_{xo} + S_{hc} = 1$.

In one embodiment, the characteristics of the geological volume of interest are determined based on the transformed second output data, the second output data provided by the second subterranean model, and results obtained with at least one of the operations (a)-(e).

In one embodiment, determining the characteristics of the geological volume of interest includes generating multiple graphs based on the transformed second output data, the second output data provided by the second subterranean model, and the results obtained with at least one of operations (a)-(e), at S50.

In one embodiment, determining the characteristics of the geological volume of interest includes exporting the transformed second output data, the second output data provided by the second subterranean model, and results obtained with at least one of the operations (a)-(e) to a common software platform, at S52.

In one embodiment, in the case of the third model, the third model output provides the density of the fluid mixture in the invaded zone (X): $\rho_{bfX}=S_o\rho_{boil}+S_{mf}\rho_{bmf}+S_{gas}\rho_{bgas}+S_{xo}\rho_{buwat}$, the fluid mixture comprising oil-based mud, where $S_o$ and $\rho_{boil}$ are respectively the saturation and density of the native oil, $\rho_{bsmf}$ and $S_{mf}$ are respectively the saturation and density of the mud filtrate, $S_{gas}$ and $\rho_{bgas}$ are respectively the saturation and density of the gas, $S_{xo}$ the water saturation in the invaded zone and $\rho_{buwat}$ the density of water in the un-invaded zone.

In an another embodiment, $\rho_{bfX}=S_o\rho_{boil}+S_{gas}\rho_{bgas}+S_{xo}\rho_{bxwat}$ is the density of the fluid mixture in the invaded zone (X) comprising water-based mud used in the third subterranean interpretation model, where $S_o$ and $\rho_{boil}$ are respectively the saturation and density of the native oil, $S_{gas}$ and $\rho_{bgas}$ are respectively the saturation and density of the gas, $S_{xo}$ and $\rho_{bxwat}$ are respectively the saturation and density of water in the invaded zone.

In yet another embodiment, $\rho_{fU}=S_o\rho_{oil}+S_{gas}\rho_{gas}+S_w\rho_{uwtr}$ is the density of the fluid mixture in the un-invaded zone (U) comprising formation water, formation oil and formation gas, used in the second and third subterranean interpretation models, where $S_o$ and $\rho_{oil}$ are respectively the saturation and density of the native oil, $S_{gas}$ and $\rho_{gas}$ are respectively the saturation and density of the gas, $S_w$ and $\rho_{uwtr}$ are respectively the saturation and density of water in the un-invaded zone.

In one embodiment, the characteristics of the geological volume of interest are determined based on the transformed second or transformed third output data, the second output data and third output data provided by, respectively, the second subterranean model and third subterranean model, and results obtained with at least one of the operations (a)-(e).

In one embodiment, determining the characteristics of the geological volume of interest includes generating multiple graphs based on the transformed second or transformed third output data, the second output data and third output data provided by, respectively, the second subterranean model and the third subterranean model, and the results obtained with at least one of the operations (a)-(e), at S50.

In one embodiment, determining the characteristics of the geological volume of interest includes exporting the transformed second output data or transformed third output data, the second output data and third output data provided by, respectively, the second subterranean model and the third subterranean model, and results obtained with at least one of the operations (a)-(e) to a common software platform, at S52.

In one embodiment, the method or methods described above can be implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Figure 3:
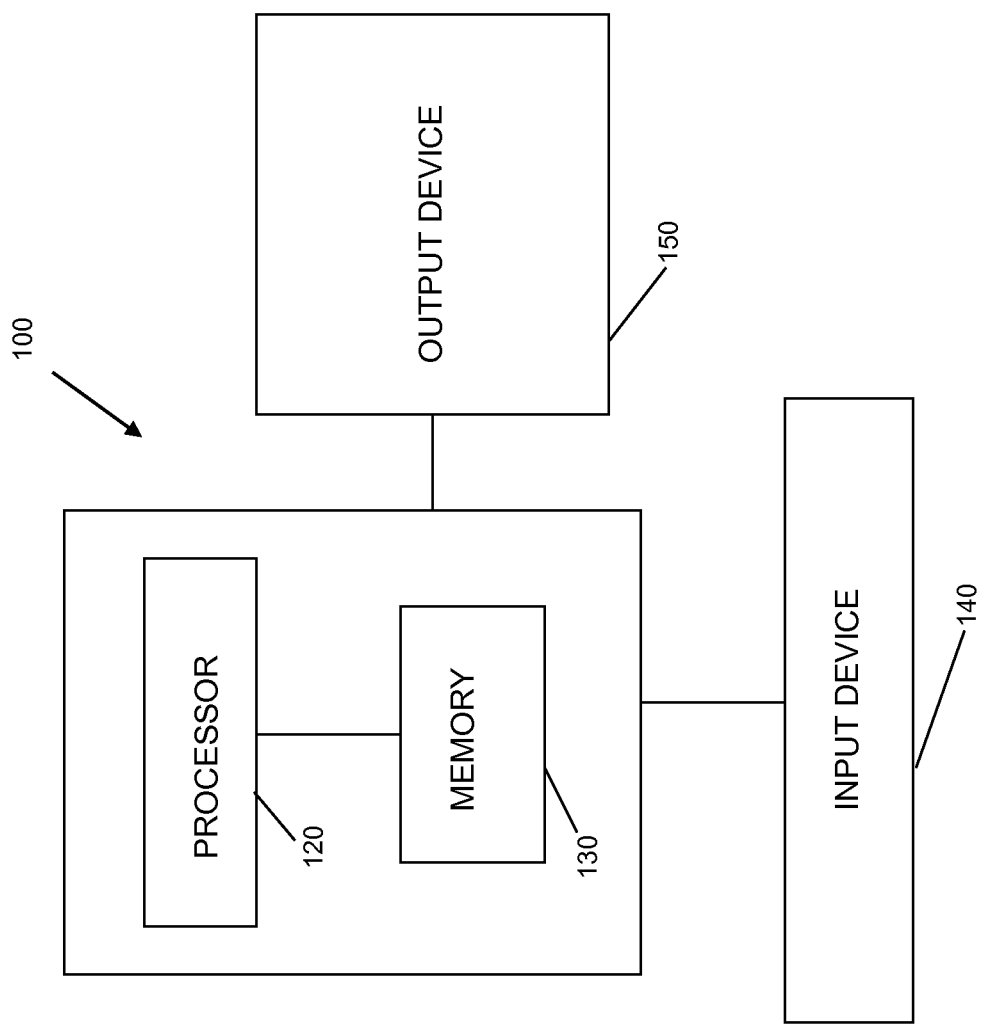
FIG. 3 is a schematic diagram representing a computer system for implementing the method, according to an embodiment of the present invention.

FIG. 3 is a schematic diagram representing a computer system 100 for implementing the method, according to an embodiment of the present invention. As shown in FIG. 3, computer system 100 comprises a processor (e.g., one or more processors) 120 and a memory 130 in communication with the processor 120. The computer system 100 may further include an input device 140 for inputting data (such as keyboard, a mouse or the like) and an output device 150 such as a display device for displaying results of the computation.

As can be appreciated from the above description, the computer readable memory 130 can be configured to store the input data from the geological volume of interest in the subterranean formation. The computer processor 120 in communication with the computer readable memory 130 can be configured to: (i) process the input data using a first subterranean interpretation model, the first subterranean interpretation model being configured to provide first output data that are representative of characteristics of the geological volume of interest; (ii) process the input data using a second subterranean interpretation model, the second subterranean interpretation model being configured to provide second output data that are representative of the characteristics of the geological volume of interest; (iii) determine a relationship between the first output data and the second output data; (iv) transform the second output data into the first output data using the relationship to obtain a transformed second output data; and (v) determine the characteristics of the geological volume of interest based on the first output data provided by the first subterranean model and the transformed second output data.

As it can be appreciated from the above description, alternatively or additionally, a third subterranean model can be used, in which case the computer processor 120 in communication with the computer readable memory 130 can be configured to, alternatively or additionally: (a) process the input data using a third subterranean interpretation model, the third subterranean interpretation model being configured to provide third output data that are representative of the characteristics of the geological volume of interest; (b) determine a second relationship between the first output data and the third output data; (c) transform the third output data into the first output data using the second relationship to obtain transformed third output data; and (d) determine the characteristics of the geological volume of interest based on the first output data provided by the first subterranean model, the transformed second output data by the relationship and the transformed third data by the second relationship.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A computer implemented method for evaluating geophysical and petrophysical characteristics of a geological volume of interest in a subterranean formation, the method comprising:
    accessing, via a computer, input data from the geological volume of interest;
    processing, via the computer, the input data using a first subterranean interpretation model, the first subterranean interpretation model being configured to provide first output data comprising a plurality of different petrophysical or geophysical properties representative of the geological volume of interest;
    processing, via the computer, the input data using a second subterranean interpretation model, the second subterranean interpretation model being configured to provide second output data comprising a plurality of different petrophysical or geophysical properties representative of the geological volume of interest, wherein the first output data comprises at least one different petrophysical property from the second output data;
    determining, via the computer, a relationship between the first output data and the second output data;
    transforming, via the computer, the second output data into the first output data using the relationship to obtain a transformed second output data; and
    determining, via the computer, the characteristics of the geological volume of interest using the first output data provided by the first subterranean interpretation model and the transformed second output data.

2. The method of claim 1, further comprising comparing the first output data and the transformed second output data to verify whether the transformed second output data is compatible with the first output data, and, if the first output data and the transformed second output data are deemed compatible, using the first output data and the transformed second output data to determine the characteristics of the geological volume of interest.

3. The method of claim 1, wherein
    (a) the first output data include at least one volume selected from the group consisting of a shale volume (VSH) and a sand volume (VSD), with VSH+VSD=1 in the geological volume of interest, and
    (b) the second output data include (i) at least one volume selected from the group consisting of a wet shale volume (VOL_SH), a dry shale volume (VOL_DSH), a wet sand volume (VOL_SD), and a volume of clay bound water (VOL_CLAY_BOUND_WATER and (ii) at least one property selected from the group consisting of a total porosity (PHIT) and an effective porosity (PHIE), with VOL_SD+VOL_SH+PHIE=1 in the geological volume of interest,
    VOL_SD+VOL_DSH+PHIT=1 in the geological volume of interest,
    PHIE=PHIT−VOL_CLAY_BOUND_WATER in the geological volume of interest, and
    VOL_DSH=VOL_SH−VOL_CLAY_BOUND_WATER in the geological volume of interest.

4. The method of claim 3, wherein the first and second output data include total water saturation (SWT) in the geological volume of interest, total water saturation in an invaded zone near a borehole (SXO) in the geological volume of interest, effective water saturation (S WE) in the geological volume of interest and effective water saturation in the invaded zone near the borehole (SXOE) in the geological volume of interest.

5. The method of claim 3, further comprising:
    determining, via the computer, a plurality of relationships between the first output data and the second output data;
    transforming, via the computer, the second output data into the first output data using the plurality of relationships; and
    determining, via the computer, the characteristics of the geological volume of interest using the first output data provided by the first subterranean model and the transformed second output data by the plurality of relationships.

6. The method of claim 1, wherein the relationship between the first output data and the second output data is defined by VSH=VOL_SH/(1−PHIE_shale), where VSH is a shale volume, VOL_SH is wet shale volume, and PHIE_shale is an effective porosity of the shale.

7. The method of claim 6, wherein the transformed second output data VSH' is obtained as follows:

$$VSH'=VOL\_SH/(1-PHIE\_shale).$$

8. The method of claim 1, further comprising:
    processing, via the computer, the input data using a third subterranean interpretation comprising a plurality of different petrophysical or geophysical properties representative of the characteristics of the geological volume of interest, wherein the third output data comprises at least one different petrophysical or geophysical property from either the first output data or the second output data;
    determining, via the computer, a second relationship between the first output data and the third output data;
    determining, via the computer, a third relationship between the second output data and the third output data;
    transforming, via the computer, the third output data into the first output data using the second relationship to obtain transformed third output data;
    transforming, via the computer, the third output data into the second output data using the third relationship to obtain transformed third output data; and
    determining, via the computer, the characteristics of the geological volume of interest using the first output data provided by the first subterranean model, the transformed second output data by the relationship and the transformed third data by the second relationship and the third relationship.

9. The method of claim 8, wherein the second relationship to transform the third output data into an equivalent first output data is defined by VSH=VOL_DCL/VOL_DCL_shale,
    where VSH is a shale volume, VOL_DCL_shale is a maximum amount of dry clay in a shale and VOL_DCL is the volume of dry clay mineral in the volume of interest, and
    wherein the third relationship to transform the third output data into the second output data is defined by VOL_SH= (1−PHIE)*(VOL_CLAY/VOL_WET_CLAY_shale)

where VOL_SH is a wet shale volume, PHIE is an effective porosity, VOL_CLAY is a volume of wet clay mineral, and VOL_WET_CLAY_shale is the amount of wet clay in the shale.

10. The method of claim 8, wherein
   (a) the first output data includes at least one volume selected from the group consisting of a shale volume (VSH) and a sand volume (VSD), with VSH+VSD=1 in the geological volume of interest,
   (b) the second output data includes (i) at least one volume selected from the group consisting of a wet shale volume (VOL_SH), a dry shale volume (VOL_DSH), a sand volume (VOL_SD), a volume of clay bound water (VOL_CLAY_BOUND_WATER), and (ii) a total porosity (PHIT), and (iii) an effective porosity (PHIE), with
   VOL_SD+VOL_SH+PHIE=1 in the geological volume of interest,
   VOL_SD+VOL_DSH+PHIT=1 in the geological volume of interest,
   PHIE =PHIT−VOL_CLAY_BOUND_WATER in the geological volume of interest, and
   VOL_DSH=VOL_SH−VOL_CLAY_BOUND_WATER in the geological volume of interest, and
   (c) the third output data include (i) at least one volume selected from the group consisting of a volume of wet clay mineral (VOL_CLAY), a volume of dry clay mineral (VOL_DCL), a volume of quartz mineral (VOL_QTZ), a volume of clay bound water (VOL_CLAY_BOUND_WATER), (ii) the total porosity (PHIT), the effective porosity (PHIE), with
   VOL_QTZ+VOL_CLAY+PHIE=1 in the geological volume of interest, and
   VOL_QTZ+VOL_DCL+PHIT=1 in the geological volume of interest.

11. The method of claim 1, further comprising at least one of
   (a) computing, via the computer, fluid properties for the geological volume of interest using the input data;
   (b) correcting, via the computer, a density log for invasion effect for the geological volume of interest using the input data to obtain a corrected density based at least in part on a density of a fluid mixture in an invaded zone proximate a wellbore and a density of the fluid mixture in an un-invaded zone at a distance from the wellbore;
   (c) computing, via the computer, all liquid volumes for the geological volume of interest using the input data if the output of the second subterranean interpretation model is saturation, such that volume of phase "i" is equal to porosity multiplied by the saturation of the phase "i";
   (d) computing, via the computer, all saturations for the geological volume of interest using the input data if the output of the second subterranean interpretation model is volume, such that saturation of phase is equal to the volume of the phase divided by the porosity; and
   (e) computing, via the computer, elastic moduli and attributes using the input data.

12. An article of manufacture comprising a computer-readable, non-transitory medium embodying machine executable instructions, the instructions being executable by a machine to perform a method for evaluating geophysical and petrophysical characteristics of a geological volume of interest in a subterranean formation, the method comprising:
   accessing, via the machine, input data from the geological volume of interest;
   processing, via the machine, the input data using a first subterranean interpretation model, the first subterranean interpretation model being configured to provide first output data comprising a plurality of different petrophysical or geophysical properties representative of the geological volume of interest;
   processing, via the machine, the input data using a second subterranean interpretation model, the second subterranean interpretation model being configured to provide second output data comprising a plurality of different petrophysical or geophysical properties representative of the geological volume of interest, wherein the first output data comprises at least one different petrophysical property from the second output data;
   processing, via the machine, the input data using a third subterranean interpretation model, the third subterranean interpretation model being configured to provide third output data that are representative of said characteristics of the geological volume of interest;
   determining, via the machine, a first relationship between said first output data and said second output data;
   transforming, via the machine, said second output data into said first output data using said first relationship;
   determining, via the machine, a second relationship between said first output data and said third output data;
   transforming, via the machine, said third output data into said first output data using said second relationship;
   determining, via the machine, a third relationship between said second output data and said third output data;
   transforming, via the machine, said third output data into said second output data using said third relationship; and
   determining, via the machine, the characteristics of the geological volume of interest using the first output data provided by the first subterranean model, the second output data, the third output data, and the transformed second and third output data.

13. A system for evaluating geophysical and petrophysical characteristics of a geological volume of interest in a subterranean formation, comprising:
   a computer readable memory configured to store input data from the geological volume of interest; and
   a computer processor in communication with the computer readable memory, and in communication with a computer-readable, non-transitory medium embodying executable code to:
   process, via the computer, the input data using a first subterranean interpretation model, the first subterranean interpretation model being configured to provide first output data comprising a plurality of different petrophysical or geophysical properties representative of the geological volume of interest;
   process, via the computer, the input data using a second subterranean interpretation model, the second subterranean interpretation model being configured to provide second output data comprising a plurality of different petrophysical or geophysical properties representative of the geological volume of interest, wherein the first output data comprises at least one different petrophysical property from the second output data;
   process, via the computer, the input data using a third subterranean interpretation model, the third subterranean interpretation model being configured to provide third output data that are representative of the characteristics of the geological volume of interest;
   determine, via the computer, a first relationship between the first output data and the second output data;
   determine, via the computer, a second relationship between the third output data and the first output data;

determine, via the computer, a third relationship between the third output data and the second output data;
transform, via the computer, the second output data into the first output data using the first relationship to obtain a transformed second output data;
transform, via the computer, the third output data into the first output data using the second relationship to obtain transformed third output data;
transform, via the computer, the third output data into the second output data using the third relationship to obtain transformed third output data; and
determine, via the computer, the characteristics of the geological volume of interest using the first output data provided by the first subterranean model, the second output data, the third output data, and the transformed second and third output data.

* * * * *